(12) United States Patent
Nowak et al.

(10) Patent No.: US 8,319,148 B2
(45) Date of Patent: Nov. 27, 2012

(54) SYSTEM AND METHOD OF DUAL LASER BEAM WELDING OF FIRST AND SECOND FILLER METALS

(75) Inventors: Daniel Anthony Nowak, Greenville, SC (US); Michael Douglas Arnett, Simpsonville, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 12/544,494

(22) Filed: Aug. 20, 2009

(65) Prior Publication Data

US 2011/0042361 A1   Feb. 24, 2011

(51) Int. Cl.
*B23K 26/00* (2006.01)
(52) U.S. Cl. .......... 219/121.76; 219/121.77; 219/121.85
(58) Field of Classification Search .................. None
See application file for complete search history.

(56) References Cited

U.S. PATENT DOCUMENTS

| | | | |
|---|---|---|---|
| 4,726,418 A | 2/1988 | Mihailov | |
| 5,179,261 A | 1/1993 | Perrotti | |
| 5,348,212 A | 9/1994 | Galanes | |
| 5,369,242 A | 11/1994 | Hatfield et al. | |
| 5,451,742 A | 9/1995 | Nishio et al. | |
| 5,595,670 A * | 1/1997 | Mombo-Caristan | 219/121.64 |
| 5,624,585 A | 4/1997 | Haruta et al. | |
| 5,726,418 A | 3/1998 | Duthoo | |
| 6,481,969 B2 | 11/2002 | Berry et al. | |
| 6,489,583 B1 | 12/2002 | Feng et al. | |
| 6,568,077 B1 | 5/2003 | Hellmann et al. | |
| 6,727,459 B1 | 4/2004 | Bialach | |
| 6,774,338 B2 | 8/2004 | Baker et al. | |
| 6,908,518 B2 | 6/2005 | Bouse et al. | |
| 6,972,390 B2 | 12/2005 | Hu et al. | |
| 2006/0261045 A1 * | 11/2006 | Wang et al. | 219/85.12 |

(Continued)

FOREIGN PATENT DOCUMENTS

EP   1920864 A1   5/2008

(Continued)

OTHER PUBLICATIONS

European Search Report and written opinion issued in connection with corresponding application No. EP10173246 on Feb. 14, 2011.

*Primary Examiner* — Benjamin Sandvik
*Assistant Examiner* — Scott R Wilson
(74) *Attorney, Agent, or Firm* — Dority & Manning, P.A.

(57) ABSTRACT

A system and method for laser beam welding at least two adjacent superalloy components involves substantially simultaneous formation of a base weld with a first filler metal placed between the components and cap weld with second filler metal formed over the base weld. A shim is inserted between the components, which may optionally be formed with a groove along the joint surface. A filler wire is fed to a location over the given surface or within the optional groove. Two lasers or a laser and coupled beam splitter supply first and second laser beams that are applied at focal points separated by a predetermined distance (e.g., 0.05-1.5 cm). The first laser beam is used to form a base weld with the first filler metal between the components, and the second laser beam is used to form a cap weld with the second filler metal on top of the base weld.

18 Claims, 3 Drawing Sheets

U.S. PATENT DOCUMENTS

| | | |
|---|---|---|
| 2007/0017906 A1 | 1/2007 | Nowak et al. |
| 2007/0175568 A1* | 8/2007 | Wang et al. ............... 156/155 |
| 2008/0029498 A1* | 2/2008 | Forrest et al. ........... 219/121.73 |
| 2008/0116175 A1 | 5/2008 | Ballerini et al. |
| 2008/0118352 A1 | 5/2008 | Wheeler et al. |
| 2008/0164301 A1 | 7/2008 | Nowak et al. |
| 2010/0230390 A1 | 9/2010 | Nishio et al. |
| 2011/0049112 A1 | 3/2011 | Johnson |

FOREIGN PATENT DOCUMENTS

| | | |
|---|---|---|
| EP | 2246144 A1 | 11/2010 |
| JP | 7132389 A | 5/1995 |

* cited by examiner

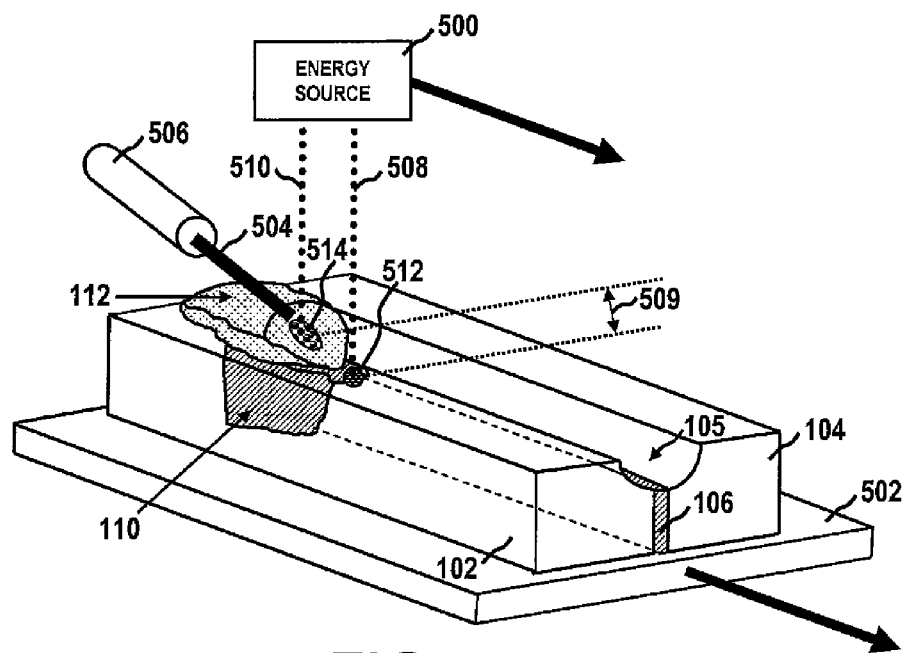
FIG. 5
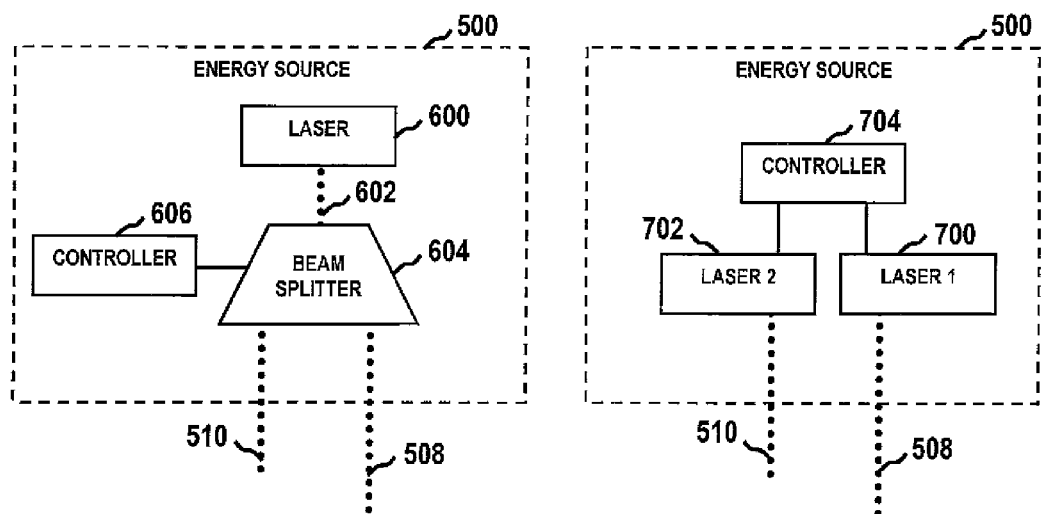
FIG. 6
FIG. 7

SYSTEM AND METHOD OF DUAL LASER BEAM WELDING OF FIRST AND SECOND FILLER METALS

FIELD OF THE INVENTION

The subject matter disclosed herein relates to laser beam welding, and more particularly, to a modified laser beam welding system and method for joining superalloy materials or clad metals such as present in gas turbine applications.

BACKGROUND OF THE INVENTION

Power generation technologies and related systems, including gas turbine engines, jet engines, wind turbines and related platforms or towers, are often subject to dynamic operating conditions. The potential stresses of such operating conditions, particularly high temperature and pressure conditions, require power generation components having increased strength and durability. One exemplary class of materials that has been developed for use in such environments corresponds to superalloys.

Superalloys are alloys containing about 50% or more by weight of a base metal, including but not limited to nickel, cobalt and iron, to which alloying elements are added to improve the mechanical and physical properties of these alloys. One particular example of a suitable superalloy for aircraft and industry gas turbine components and other applications is René N5, a Nickel-based rhenium single crystal superalloy. These superalloy materials have been found to exhibit not only good strength, but also creep resistance, fracture roughness and other mechanical properties at elevated temperatures for extended periods of time.

The welding together of superalloy materials has been a relatively difficult process requiring very particular welding conditions. For example, the use of a low heat input welding process, such as laser or electronic beam, has produced weld joints over a very narrow range of welding conditions. One drawback to these beam processes is the directional grain growth in the fusion zone which forms a distinct dendritic boundary in the center of the weld zone. This type of grain structure makes the joint vulnerable to centerline cracking and results in very poor fatigue strength, which can result in catastrophic failure of the weld joint during operation of a gas turbine.

To overcome the centerline cracking problems, several alternative processes have been developed for welding superalloys. Among them, the wire feed electron beam process, autogenous laser welding, gas tungsten arc process (TIG), and preplaced shim electron beam or laser processes have been considered in the context of improving fatigue life of the joint. A simple wire feed welding process adds ductile superalloy filler metal, through an automatic wire feeder during electron beam welding of two metallic pieces. However, this process is limited by the joint thickness. Also, lack of penetration (LOP) defects often occur when the joint thickness is increased beyond 0.25 cm. Laser based welding without the use of a filler metal (i.e., autogenous welding) can exhibit very low ductility and can crack during, or soon after, solidification. The high heat input associated with arc welding can cause relatively large airfoil distortions and increase the risk of lack of fusion defects in the weld, thus prohibiting use of TIG techniques as the primary welding process for complex airfoil structures. Adding a pre-placed shim between two welded components has increased joint thickness as well as the ductility of the weld deposit to reduce the cracking of the weld metal. However, cracking may still occur if the ductility is not high enough.

The art is continuously seeking improved systems and methods for welding superalloys and other materials, to improve the performance of welded components and expand the repair options related to use of such components.

BRIEF DESCRIPTION OF THE INVENTION

Aspects and advantages of the invention will be set forth in part in the following description, or may be obvious from the description, or may be learned through practice of the invention.

In general, exemplary embodiments of the present invention concern methods for laser beam welding at least two adjacent components by substantially simultaneous formation of a base weld with a first filler metal placed between the components and cap weld with second filler metal formed over the base weld.

One exemplary method of the present invention concerns a method of laser beam welding at least two adjacent metallic components. A first filler metal is provided within a joint formed between at least first and second components. A second filler metal is fed over the joint formed between the at least first and second components. First and second laser beams are applied at respective first and second focal points separated from one another by a predetermined distance. The first laser beam is used to form a base weld with the first filler metal between the at least first and second components. The second laser beam is used to form a cap weld with the second filler metal on top of the base weld. The base weld and the cap weld are formed with a single pass of the first and second laser beams across the joint formed between the at least first and second components.

Another exemplary embodiment of the present invention concerns a system for laser beam welding at least two superalloy components including a first filler metal, a second filler metal, an energy source and a controller. The first filler metal is provided within a joint formed between at least first and second superalloy components. The second filler metal is fed over the joint formed between the at least first and second superalloy components. The energy source provides first and second laser beams at respective first and second focal points. The controller is coupled to the energy source and is structurally configured to control power and location of the first and second laser beams such that the first laser beam forms a base weld with the first filler metal between the at least first and second superalloy components and the second laser beam forms a cap weld with the second filler metal on top of the base weld in a single pass of said first and second laser beams across the joint formed between the at least first and second superalloy components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which:

FIG. 5 is a schematic perspective view of exemplary hardware components for use in forming a weld in accordance with aspects of the present invention;

FIG. 6 is a schematic view of a first exemplary embodiment of an energy source for use with an exemplary welding process of the present invention;

FIG. 7 is a schematic view of a second exemplary embodiment of an energy source for use with an exemplary welding process of the present invention.

DETAILED DESCRIPTION OF THE INVENTION

Figure 1:
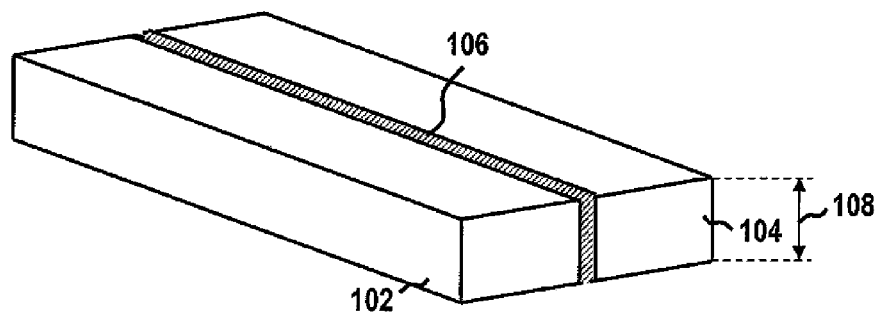
FIG. 1 is a perspective view of a pre-welded assembly of two components and a shim of first filler metal.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIGS. 1-4 show perspective views of two exemplary component assemblies before and after application of the presently disclosed welding techniques. Such figures and the related description discuss welding of first and second components together, although it should be appreciated that a larger number of components and/or multiple joints between the first, second and other components may be welded in accordance with the disclosed techniques.

As shown in FIG. 1, first and second generally metallic components 102 and 104 are provided. In one particular embodiment, components 102 and 104 are components made of one or more respective superalloy materials. The methods disclosed herein are particularly suited for welding superalloy materials, for example, single crystal nickel-based superalloys such as René N5 and others in the René family of materials, such as are utilized in gas turbines and the like. Components 102, 104 may alternatively correspond to other superalloy examples including nickel-based, cobalt-based and iron-based superalloys. Specific examples of nickel-based superalloys include gamma-prime-enhanced nickel-based superalloys that are provided in either wrought or cast form (e.g., using equiaxed, directionally solidified or single crystal castings), such as but not limited to GTD-222, GTD-111 and René N5 materials. A specific example of an iron-based superalloy corresponds to an A286 alloy. A specific example of a cobalt-based superalloy corresponds to FSX-414.

Referring still to FIG. 1, a metallic shim 106 is inserted at a joint formed between the two components 102, 104. In the example of FIG. 1, shim 106 as well as the portions of first and second components 102, 104 near shim 106 and the corresponding joint between first and second components 102, 104 are all characterized by a height dimension 108 that is substantially the same. Although not shown, it should be appreciated that in some embodiments the shim 106 may extend above or below the height of the first and second components. Still further, it should be appreciated that one or more small gaps may exist between shim 106 and the adjacent components 102, 104 (e.g., respective gaps of about 0-0.025 cm between the shim and adjacent component surface).

Shim 106 is made of a first filler metal, which may correspond to a variety of suitable materials. In one example, the first filler metal may include a high strength superalloy material, such as but not limited to a gamma prime strengthened superalloy strengthened from 10% to 60% gamma prime. Specific examples may include but are not limited to a precipitation-hardenable nickel-chromium-cobalt alloy with an addition of molybdenum for solid-solution strengthening (e.g., NIMONIC 263), as well as nickel-based gamma prime strengthened superalloys (e.g., GTD-222, GTD-111 and the René family of materials). Additional examples of high strength superalloys for use as the first filler material include gamma double prime strengthened alloys such as but not limited to Alloy 718 (a nickel-chromium-molybdenum alloy), Alloy 706 (a nickel-iron-chromium alloy) and Alloy 725 (a nickel-chromium-molybdenum-niobium alloy). In another example, the first filler metal may include a more ductile superalloy material such as but not limited to a solid-solution strengthened nickel-chromium-cobalt-molybdenum superalloy such as INCONEL alloy 617 (IN617), a nickel-chromium-molybdenum superalloy such as INCONEL alloy 625 (IN625), or a nickel-chromium-tungsten superalloy such as HAYNES 230 (HA230).

Figure 2:
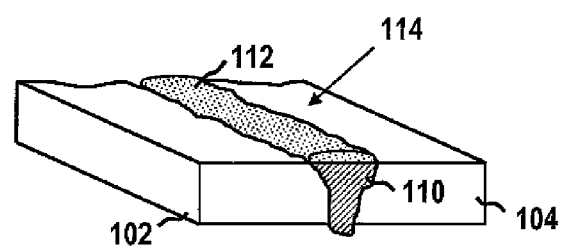
FIG. 2 is a perspective view of a post-welded assembly of two components with a shim of first filler metal and a cap weld of second filler metal formed along a top surface.

FIG. 2 shows the component assembly of FIG. 1 after application of the disclosed welding techniques. As shown in FIG. 2, a base weld 110 is formed by heating shim 106 to a sufficient level to penetrate the entire depth of the shim between first and second components. On top of the base weld 110, a cap weld 112 is formed during the same welding pass by heating a second filler metal (e.g., a filler wire provided on top of the joint between first and second components 102, 104). In the embodiment of FIG. 2, cap weld 112 is generally formed along the upper surface 114 formed by first and second components 102, 104. It should be appreciated that some portions of the second filler metal used for cap weld 112 may also flow downwards toward the base weld, such as into portions of any gaps between shim 106 and adjacent portions of components 102, 104. It should be further appreciated that cap weld 112 may be formed as a continuous weld as shown in FIG. 2, or may alternatively be formed as an intermittently applied weld only where needed. For example, cap weld 112 may correspond to a stitch weld which forms a spaced series of separate or varied thickness cap weld portions.

The second filler metal used in cap weld 112 may include any of the above examples disclosed for the first filler metal in base weld 110 and others. In specific examples, it may be useful to include a high strength superalloy for the first filler metal and one of the more ductile superalloys, such as but not limited to IN617, IN625 or HA230 materials, for the second filler metal. In other specific examples, the ductility of the second filler metal may be higher than the ductility of the first filler metal. For example, first filler metal may have an elongation (defined in accordance with ASTM E8 Standard Test Methods for Tension Testing of Metallic Materials) of about 10-30%, while second filler metal may have an elongation of about 50-75%.

In a variation to the embodiment shown in FIGS. 1 and 2, the first filler metal between components 102, 104 is not a separate shim but instead corresponds to clad metal that has been applied as a coating on one or more surfaces of one or both components 102, 104. In such instance, the subject welding techniques can be used to join clad metals to themselves. That is, a base metal that has already been cladded is joined to a similar base material with cladding. A deep penetrating first laser beam form a base weld between the two materials, while a second laser beam would apply the cladding chemistry on top. Thereby, two clad-metal pieces could be joined in a single operation.

Figure 3:
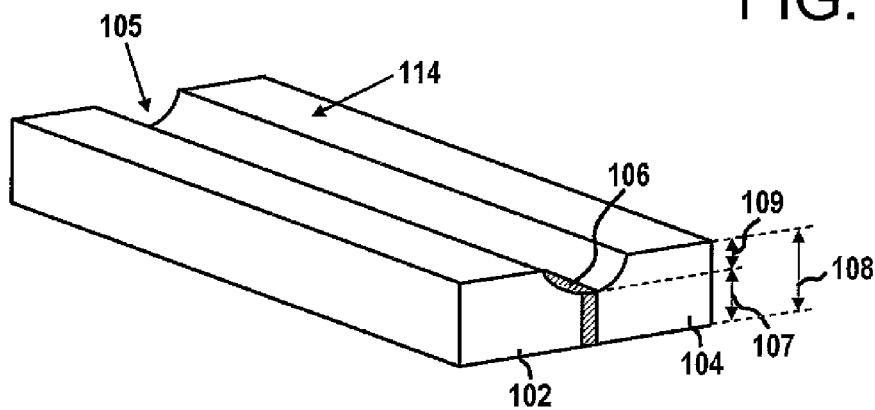
FIG. 3 is a perspective view of a pre-welded assembly of two components having a surface groove and a shim of first filler metal.
Figure 4:
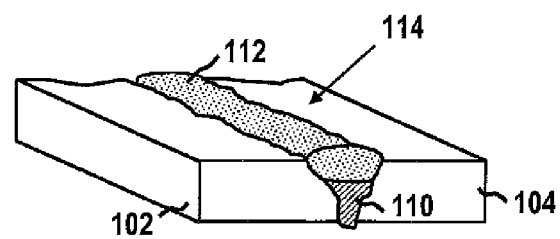
FIG. 4 is a perspective view of a post-welded assembly of two components with a shim of first filler metal and a cap weld of second filler metal disposed in the surface groove.

An alternative embodiment of a component assembly achieved in accordance with the disclosed welding techniques is shown in FIGS. 3 and 4. Like reference numerals are used to indicate similar elements. For example, first and second components 102 and 104 in FIGS. 3 and 4 are similar to first and second components 102 and 104 in FIGS. 1 and 2, except that the embodiment shown in FIGS. 3 and 4 involves the formation of a groove along the top surface of the components and the formation of a cap weld within this groove as opposed to along the top surface.

Referring more particularly to FIG. 3, first and second components 102 and 104 are formed with a groove 105 along a given surface (e.g., upper surface 114.) Groove 105 generally corresponds to a channel that extends longitudinally along the substantially entire dimension of the joint between first and second components 102, 104. As illustrated, groove 105 may be formed to define a channel having a generally U-shaped cross-section, although other arrangements including but not limited to a V-shaped or rectangular cross-section may be used. By providing groove 105 at the joint between first and second components 102, 104, a directed location for contacting the shim 106 to form the base weld 110 is provided. In addition, an area in which to form cap weld 112 is provided such that cap weld 112 is formed at least partially between first and second components 102, 104 instead of only along the top surface of the components. Such configuration accommodating a higher volume cap weld 112 than that shown in FIG. 2 may provide further increased weld durability and decreased cracking.

In one exemplary embodiment of FIGS. 3 and 4, the height 107 of shim 106 is greater than the height 109 of groove 105, and thus the height of the base weld 110 is greater than the height of cap weld 112. In one particular example, the height of first and second components 102, 104 corresponds to a height dimension 108 as shown in FIG. 3. The height of the shim 106, which corresponds to the height 107 of the first and second components 102, 104 near the joint between the first and second components corresponds to about 60-80% of height dimension 108. The height dimension 109 corresponding to the deepest portion of groove 105 thus corresponds to the difference between height 108 and height 107, which may typically be about 20-40% of the height dimension 108.

An exemplary system for achieving the welded components shown in FIGS. 2 and 4 is illustrated in schematic form in FIG. 5. As shown in FIG. 5, an energy source 500 is provided above a component assembly to be welded. The component assembly may be provided on top of a platform 502, and more particularly includes first and second components 102, 104 between which a shim 106 of first filler metal has been inserted. A filler wire 504 of second filler metal is fed from a filler source 506, such as a wire spool to a location above shim 106. When a groove 105 is formed between the first and second components 102, 104 as shown in FIG. 5, the end of filler wire 504 may be positioned within groove 105.

First and second laser beams 508 and 510 are provided as outputs from energy source 500 and are applied at respective first and second focal points 512 and 514 along the component assembly shown in FIG. 5. The first focal point 512 generally corresponds to a location along shim 106 to form the base weld 110 penetrating between first and second components 102, 104. The second focal point 514 generally corresponds to a location along or at the end of filler wire 504 to form the cap weld 112 on top of base weld 110. It should be appreciated that the actual focal points of the lasers may be focused at positions that are higher or lower than the respective surfaces of the shim and filler wire.

The beam separation distance 509 between first and second focal points 512, 514 (or between parallel points within first and second laser beams 508, 510) may correspond to a sufficiently small distance such that the laser beams can separately form the base weld 110 and cap weld 112 but that the cap weld 112 is formed immediately over the base weld 110 before base weld 110 has a chance to cool and solidify. In one example beam separation distance 509 is selected from a range of between about 0.5 cm and about 1.5 cm. Such distance may be measured directly between the first and second focal points. In another embodiment, the separation distance 509 corresponding to the exemplary range of between about 0.5-2.0 cm can be broken down into both a horizontal separation distance and a vertical separation distance. Applying the first and second focal points at different horizontal locations enables the formation of the base weld before the formation of the cap weld. Applying the first and second focal points at different vertical locations also enables the first laser beam to penetrate deeper into the base weld while the second laser beam works to form the cap weld at a slightly higher vertical position. In one example, the horizontal separation distance between first and second focal points is between about 0.5-2.0 cm, while the vertical separation distance between first and second focal points is between about 0.1-1.0 cm.

The dual beam laser welding method shown schematically in FIG. 5 allows the joining of the first and second components 102 and 104 with first laser beam 508 and the fusion of the ductile cap weld 112 prior to the base weld 110 cooling. As such, the formation of the base weld 110 and the cap weld 112 may occur by applying first and second laser beams in single welding step, for example by substantially simultaneous application of the first and second laser beams to the respective first and second filler metals. The formation of both base weld 110 and cap weld 112 in a single welding pass prevents the base weld 110 from having time to solidify and crack before the ductile top cap weld 112 is applied. As a result, the entire weld (formed from both base weld 110 and cap weld 112) solidifies uniformly, thus significantly reducing the tendency of solidification cracking.

The formation of base weld 110 and cap weld 112 in a single welding pass is achieved by precisely controlled application of both the first laser beam 508 and second laser beam 510. The welds 110, 112 are formed along the joint between first and second components 102, 104 by either fixing the component assembly and moving the energy source 500 outputting the first and second laser beams 508, 510 or by fixing the energy source 500 and moving the component assembly along platform 502. The speed at which such relative movement may occur is specifically chosen to facilitate optimum welding conditions, and may correspond in one example to a speed selected from a range of about ten (10) cm per minute to about four-hundred (400) cm per minute.

The size of the base weld 110 and the cap weld 112 depends in part on the size of the first and second components 102, 104 and the corresponding suitably chosen sizes of the provided first filler metal (e.g., shim 106) and second filler metal (e.g., filler wire 504). In one example, shim 106 is characterized by a thickness selected from within a range of about 0.02 cm to about 0.08 cm. In one example, filler wire 504 is provided with a diameter selected from a range of between about 0.02 cm and about 0.15 cm. It should be appreciated that with larger wire diameters (e.g., diameters greater than or equal to 0.075 cm), it may be desirable to preheat the wire prior to entering the laser beam or weld pool forming cap weld 112.

In one exemplary embodiment, energy source 500 corresponds to a laser energy source that provides a first laser beam 508 and a second laser beam 510 as outputs. Lasers used to provide such outputs may correspond to a variety of types, including but not limited to solid-state lasers (e.g., fiber-hosted lasers, direct diode lasers, photonic crystal lasers (e.g., Nd:YAG lasers), semiconductor lasers, gas lasers (e.g., carbon dioxide ($CO_2$), helium-neon, argon-ion), chemical lasers, excimer lasers, dye lasers and free electron lasers. The lasers may be configured to operate as either continuous or pulsed lasers. In one example, the power level of the first and second laser beams 508, 510 is about the same. In another example, the power level of the first laser beam 508 may be greater than the power level of second laser beam 510. For instance, first laser beam 508 may be provided at a power level of about 70% the output power of the energy source, and second laser beam 510 may be provided at a power level of about 30% of the output power of the energy source. As such, the power level of first laser beam 508 may actually be about twice as much or greater than the power level of second laser beam 510.

As more particularly shown in FIG. 6, one exemplary configuration of energy source 500 includes a laser 600 that provides an initial laser beam 602. Laser beam 602 is provided to a beam splitter 604 which then splits the initial beam 602 into two laser beams 508 and 510 which are used to respectively form the base weld 110 and cap weld 112. Beam splitter may correspond to any optical element or combination of optical elements, e.g., a prism or mirror, that serves to split the laser beam 602 into two beams 508 and 510, which may be provided in a substantially parallel direction. A controller 606 may be coupled to beam splitter 604 and used to set the distance between laser beams 508 and 510, the vertical and/or horizontal position of the focal points, and/or the power level of each laser beam.

As more particularly shown in FIG. 7, another exemplary configuration of energy source 500 includes a first laser 700 that provides the first laser beam 508 as output and a second laser 702 that provides the second laser beam as output. The embodiment of FIG. 7 may also include a controller 704 coupled to the respective lasers 700 and 702 to set the distance between laser beams 508 and 510, the horizontal and/or vertical focal points of the laser beams 508, 510, as well as the power level of each laser beam. When first and second lasers 700 and 702 are used, the first and second laser beams 508 and 510 may not necessarily be provided in a substantially parallel direction. For example, the first laser beam 508 may be provided in a substantially perpendicular direction (about 90 degrees) relative to platform 502. However, the second laser beam 510 may be applied at an angle (to better accommodate the separate hardware of second laser 702). For example, the second laser beam 510 may be applied at any suitable angle between 0-90 degrees (e.g., 40-70 degrees) relative to the platform 502.

When controllers 606 and 704 are used, such devices may respectively include at least a memory device(s), for example, a computer-readable medium, for receiving and storing user inputs as well as computer-readable instructions and a processor for executing the instructions and adapting the controller to function as a special-purpose apparatus and interface for implementing specific operational parameters of the energy source 500.

Exemplary operational parameters for the laser beams, including power levels, frequency levels, travel speed and the like are specifically chosen to be high enough for full penetration between the welded components in forming the base weld, yet low enough to avoid undesirable heat damage to the components such as inadvertent cutting through the metals. Travel speed of the welded components along a platform is also specifically chosen to avoid overheating from slow travel speed or fusion defects as a result of a shallow weld from high travel speed. In one particular embodiment, first and second laser beams 508 and 510 are respectively provided with operating conditions including a power level of between about 500-20,000 Watts, travel speed of 10-400 cm per minute, and focal length of about 10-25 cm.

Figure 8:
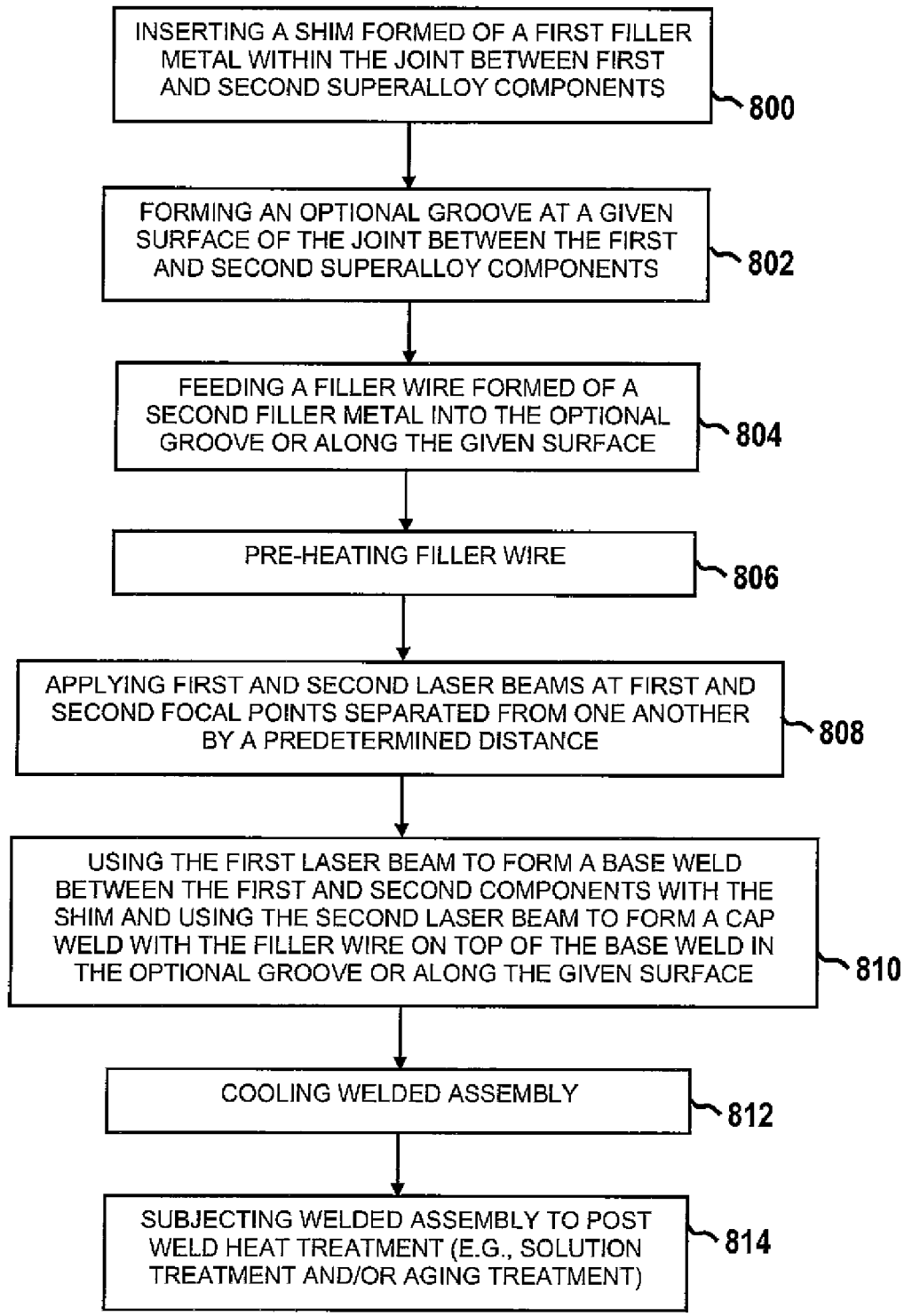
FIG. 8 is a block diagram of exemplary steps in a welding process in accordance with one aspect of the present invention.

The above described welding techniques in accordance with an embodiment of the present invention may be further appreciated with reference to FIG. 8 which sets forth a flow chart of exemplary welding process steps. A first exemplary step 800 involves providing a first filler metal (e.g., by inserting a shim formed of a first filler metal) between first and second superalloy components. In optional step 802, a groove is formed along a given surface of the joint between the first and second components. An example of such groove is shown in FIGS. 3 and 5. In step 804, a filler wire formed of a second filler metal is fed into the optional groove or along the given surface between first and second components, as shown in FIG. 5. In step 806, the second filler metal may be preheated before it is welded. For example, a filler wire may be subjected to a hot wire process such as resistance heating, induction coil heating or other heating process to prepare the filler metal and facilitate a more efficient cap weld.

Referring still to FIG. 8, step 808 involves the application of first and second laser beams at first and second focal points that are separated from one another by a beam separation distance, such as previously described to be within a range of between about 0.5 and 2.0 cm. In step 810, the first laser beam is used to form a base weld between the first and second components with the shim, and the second laser beam is used to form a cap weld with the filler wire on top of the base weld in the optional groove or along the given surface. The base weld and cap weld are formed in a single pass of the first and second laser beams over the joint between first and second components. Optional step 812 involves cooling the base weld and cap weld after both are formed. Optional step 814 then involves applying a post weld heat treatment (PWHT) to further strengthen the welds formed between first and second components by precipitating strengthening elements in the first and/or second filler materials. In one example, PWHT step 814 comprises a two-step process of heat application, including first applying a solution treatment to the filler materials and then applying an aging, or age hardening, treatment. For example, solution treatment may involve subjecting the welded assembly to a high temperature (e.g., 1000-1200° C.) for a period of 1-3 hours and aging may involve subjecting the welded assembly to a temperature (e.g., 600-750° C. for gamma prime precipitation and/or 750-900° C. for gamma double prime precipitation) for a period of 4-24 hours. Additional optional steps may include grinding portions of the base weld and/or cap weld that extend beyond the upper or lower surfaces of the first and second components.

While the subject welding techniques have been described in terms of welding components, it will be appreciated that the disclosed methods can be used to weld any of a variety of turbine parts, for example, steam exit chimney to nozzle joint welding, bucket to bucket tip cap welding, bucket tip cap to nozzle cover welding, aft frame to transition piece joining, end cover manifold closure, welding of offshore wind cladded tower sections, joining or repairing welding on the internal diameter of a cladded pressure vessel, joining or repairing welding of rotors where the cap weld in conjunction with a base weld exhibits greater ductility, etc.

The present design offers advantages in that a welding process is achieved that simultaneously accomplishes multiple welds in a single manufacturing pass, thus improving processing speed. This technique also helps prevent cracks that can potentially form in the welded components and in the filler metals used to form welds between the components (e.g., such as may be located as cracks in the joint between the welded components or as transverse cracks along an upper surface of the welded components.) The elimination of weld cracking reduces the potential amount of rework that may need to be done in welding components subject to dynamic operating conditions.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of laser beam welding at least two adjacent metallic components, comprising:
   providing a first filler metal within a joint formed between at least first and second components;
   feeding a second filler metal over the joint formed between the at least first and second components;
   applying first and second laser beams at respective first and second focal points separated from one another by a predetermined distance;
   using the first laser beam to form a base weld with the first filler metal between the at least first and second components; and
   using the second laser beam to form a cap weld with the second filler metal on top of the base weld;
   forming a cap weld immediately over the base weld before the base weld cools;
   wherein the base weld and the cap weld are formed with a single pass of the first and second laser beams across the joint formed between the at least first and second components.

2. The method of claim 1, further comprising applying a laser output to a beam splitter to form the first and second laser beams.

3. The method of claim 1, further comprising a step of forming a groove along the upper surface of each first and second component at the joint formed between the at least first and second components; and wherein the cap weld formed on top of the base weld is formed within the groove.

4. The method of claim 3, wherein the depth of the groove formed along the upper surface of each first and second component at the joint between the at least first and second components is selected to be within a range of between about 20 percent and about 40 percent of the height dimension of the first and second components just outside the groove.

5. The method of claim 1, wherein a power level of the first laser beam is greater than a power level of the second laser beam.

6. The method of claim 1, further comprising:
   cooling the base weld and cap weld formed between the at least first and second components; and
   subjecting the welded components to a post weld heat treatment.

7. The method of claim 1, further comprising a step of pre-heating the filler wire before applying the second laser beam to the second filler metal to form the cap weld.

8. The method of claim 1, wherein the predetermined distance between the first and second laser beams is selected from a range of between about 0.5 cm and about 1.5 cm.

9. The method of claim 1, wherein providing a first filler metal comprises inserting a shim of first filler metal within the joint formed between the at least first and second components, and wherein the second filler metal comprises a filler wire.

10. The method of claim 9, wherein the shim formed of the first filler metal is characterized by a shim thickness selected from a range of between about 0.02 cm and about 0.08 cm, and wherein the second filler metal comprises a filler wire characterized by a diameter selected from a range of between about 0.02 cm and about 0.15 cm.

11. The method of claim 1, wherein providing a first filler metal within a joint formed between at least first and second components comprises providing first and second components coated with a clad metal such that the clad metal is provided in the joint formed between the at least first and second components.

12. The method of claim 1, wherein the at least two adjacent metallic components respectively comprise superalloy components.

13. A system for laser beam welding at least two superalloy components, comprising:
   a first filler metal provided within a joint formed between at least first and second superalloy components;
   a second filler metal fed over the joint formed between the at least first and second superalloy components;
   an energy source configured to provide first and second laser beams at respective first and second focal points;
   a controller coupled to said energy source and structurally configured to control power and location of the first and second laser beams such that the first laser beam forms a base weld with the first filler metal between the at least first and second superalloy components and the second laser beam forms a cap weld with the second filler metal on top of the base weld in a single pass of said first and second laser beams across the joint formed between the at least first and second superalloy components, wherein said first filler metal comprises a shim inserted within the joint formed between the at least first and second superalloy components, said second filler metal comprises a filler wire fed over the joint formed between the at least first and second superalloy components, the shim formed of the first filler metal is characterized by a shim thickness selected from a range of between about 0.02 cm and about 0.08 cm, and the filler wire formed of the second filler metal is characterized by a diameter selected from a range of between about 0.02 cm and about 0.15 cm.

14. The system of claim 13, wherein said controller is further structurally configured to control the distance between said first and second focal points to a range of between about 0.05 cm and about 1.5 cm.

15. The system of claim 13, wherein said controller is further structurally configured to control the depth of the first and second focal points such that the depth of the first focal point is greater than the depth of the second focal point.

16. The system of claim 13, wherein said controller is further structurally configured to control power levels of said first and second laser beams such that the power level of the first laser beam is greater than the power level of the second laser beam.

17. The system of claim 13, wherein said energy source comprises a first laser providing said first laser beam in a substantially perpendicular direction to the at least first and second components; and a second laser providing said second laser beam in an angled direction to the at least first and second components.

18. The system of claim 13, wherein said energy source comprises a laser and a beam splitter, said laser being provided to said beam splitter such that said beam splitter provides said first and second laser beams as output.

* * * * *